(12) United States Patent
Chen et al.

(10) Patent No.: US 9,507,631 B2
(45) Date of Patent: *Nov. 29, 2016

(54) MIGRATING A RUNNING, PREEMPTED WORKLOAD IN A GRID COMPUTING SYSTEM

(71) Applicant: INTERNATIONAL BUSINESS MACHINES CORPORATION, Armonk, NY (US)

(72) Inventors: Chong Chen, Richmond Hill (CA); Sam Sanjabi, Toronto (CA); Michael John Spriggs, Toronto (CA); Zhao Xing, Xian (CN); Jie Zhu, Xian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,611

(22) Filed: Sep. 9, 2014

(65) Prior Publication Data

US 2015/0154056 A1    Jun. 4, 2015

Related U.S. Application Data

(63) Continuation of application No. 14/095,353, filed on Dec. 3, 2013.

(51) Int. Cl.
*G06F 9/46* (2006.01)
*G06F 9/48* (2006.01)
*G06F 9/50* (2006.01)

(52) U.S. Cl.
CPC ........... *G06F 9/4856* (2013.01); *G06F 9/5038* (2013.01); *G06F 9/5083* (2013.01); *G06F 2209/5014* (2013.01)

(58) Field of Classification Search
CPC .................................................... G06F 9/4856
See application file for complete search history.

(56) References Cited

U.S. PATENT DOCUMENTS 6,895,585 B2   5/2005   Smith
7,010,596 B2   3/2006   Bantz et al.
(Continued)

OTHER PUBLICATIONS

T. Amudha et al., "QoS Priority Based Scheduling Algorithm and Proposed Framework for Task Scheduling in a Grid Environment," Source: Recent Trends in Information Technology (ICRTIT), 2011 International Conference, Date of Conference: Jun. 3-5, 2011, pp. 650-655.

(Continued)

*Primary Examiner* — Emerson Puente
*Assistant Examiner* — Steven Do
(74) *Attorney, Agent, or Firm* — Kelly Kordzik; Matheson Keys Daffer & Kordzik PLLC

(57) ABSTRACT

A preempt of a live migratable workload, or job, in a distributed computing environment is performed, allowing it to release its resources for use by a higher priority workload by moving to another place in the distributed computing environment without interruption. A job scheduler receives a request to schedule a higher priority job, wherein resources needed to run the higher priority job are already dedicated for use by a currently running lower priority job. A dummy job is scheduled at a highest priority that is a copy of the lower priority job. Resources required to run the dummy job are reserved. A live migration of the lower priority job to another host is initiated, and its resources are then released. Upon a successful completion of the live migration of the lower priority job, the higher priority job is then dispatched to run using the now released resources.

19 Claims, 11 Drawing Sheets

(56) References Cited

U.S. PATENT DOCUMENTS

| | | | |
|---|---|---|---|
| 7,594,015 | B2 | 9/2009 | Bozak et al. |
| 7,693,931 | B2 | 4/2010 | Polan |
| 7,975,270 | B2 | 7/2011 | Ferri et al. |
| 8,458,691 | B2 | 6/2013 | Fellenstein et al. |
| 8,468,533 | B2* | 6/2013 | Miyazaki ............. G06F 9/4881 718/103 |
| 2005/0060704 | A1 | 3/2005 | Bulson et al. |
| 2008/0256223 | A1* | 10/2008 | Chan .................. H04L 67/1008 709/223 |
| 2009/0276781 | A1 | 11/2009 | Chan et al. |
| 2010/0169253 | A1 | 7/2010 | Tan |
| 2011/0145380 | A1* | 6/2011 | Glikson ............... G06F 9/4856 709/223 |
| 2012/0185868 | A1 | 7/2012 | Bartfai-Walcott et al. |
| 2012/0291041 | A1 | 11/2012 | Cipar et al. |
| 2013/0014103 | A1* | 1/2013 | Reuther ............... G06F 3/0647 718/1 |
| 2013/0125129 | A1 | 5/2013 | Chakravorty et al. |

OTHER PUBLICATIONS

C. Clark et al., "Live Migration of Virtual Machines," NSDI'05 Proceedings of the 2$^{nd}$ Conference on Symposium on Networked Systems Design & Implementation, vol. 2, pp. 273-286, May 2, 2005.

C. Du et al., "Dynamic Scheduling With Process Migration," Source: Cluster Computing and the Grid, 2007, CCGRID 2007, Seventh IEEE International Symposium, Date of Conference: May 14-17, 2007, 8 pages.

I. Foster et al., "The Anatomy of the Grid, Enabling Scalable Virtual Organizations," Intl J. Supercomputer Applications, 2001, 25 pages.

"Grid Computing," http://en.wikipedia.org/w/index.php?title=Grid_computing&oldid=580721364, 13 pages, downloaded from Internet on Dec. 3, 2013.

IBM Systems & Technology Group, "Accelerating parallel processing while simplifying heterogeneous environment management," Nov. 2012, 8 pages.

IBM Technical Computing, "IBM Platform Computing," 4 pages, May 2012.

IBM Technical Computing, "IBM Platform LSF Product Family," 6 pages, Oct. 2012.

IBM Technical Computing, "High performance computing cloud offerings from IBM," 6 pages, Oct. 2012.

K. Krauter et al., "A taxonomy and survey of grid resource management systems for distributed computing," Softw. Pract. Exper. 2002; 32:135-164, Sep. 17, 2001.

MOAB Workload Manager, Administrator's Guide, Version 5.4, Adaptive Computing, Section 17.1, 2010, pp. 395-400.

M. Stillwell et al., "Dynamic Fractional Resource Scheduling for HPC Workloads," 2010 IEEE International Symposium on Parallel & Distributed Processing (IPDPS), Apr. 19-23, 2010, pp. 1-12.

* cited by examiner

MIGRATING A RUNNING, PREEMPTED WORKLOAD IN A GRID COMPUTING SYSTEM

CROSS-REFERENCE TO RELATED APPLICATION

This application is a continuation of U.S. patent application Ser. No. 14/095,353, filed Dec. 3, 2013.

TECHNICAL FIELD

The present invention relates in general to distributed computing systems, and in particular, to workload placement techniques in a distributed computing system.

BACKGROUND

In distributed computing, different computers within a network share one or more resources. Essentially, grid computing is a form of distributed computing. In a grid computing system, grid resources are shared, turning a loosely coupled computer network into a "super virtual computer." A grid computing system (also referred to herein as simply the "grid") can be as simple as a collection of similar computers running on the same operating system or as complex as inter-networked systems comprised of every computer platform one can think of. With a proper user interfere, accessing a grid computing system looks no different than accessing a local machine's resources. Every authorized computer has access to enormous processing power and storage capacity. Thus, grid computing systems work on a principle of pooled resources.

In high performance computing ("HPC"), "preemptive scheduling" refers to a process whereby a pending high-priority workload takes resources away from a currently running workload of a lower priority, whereby a program managing workload distribution designates the relative priorities of scheduled workloads. A workload (also interchangeably referred to herein as a "job"), refers to a set of tasks and/or processes to be performed to accomplish a desired end result and/or create an output.

Referring to FIGS. 4-6, current grid management tools release preempted workload resources in one of three ways: by suspending the workload, by saving its state and moving it (also referred to as "check-pointing it"), or by killing and rescheduling it. Suspending a workload means that the system will pause it until the very same resources it was using are again available. Check-pointing a workload means that the system will save its state in external storage, terminate the process, and then restart it from the last saved point, after finding new resources on which to run it. Killing a workload means that the system will terminate the process, and reschedule it to run from the beginning.

FIG. 4 illustrates a state transition diagram of a low-priority workload currently running (state 401) on a grid, which is preempted by killing it. When the action taken to preempt is killing it (action 402), the workload is terminated and returned to the pending queue (state 403) to be rescheduled, losing any work it had already performed. When it is resumed (action 404), it has to start from the beginning, returning it to a running job (state 405).

FIG. 5 illustrates a state transition diagram of a low-priority workload currently running (state 501) on a grid, which is preempted by suspending it. Suspending the workload (state 503) improves on the previous situation in FIG. 4 because the job is paused and retains all the work it had done up to when it was paused (action 502). However, the penalty for suspension is that the job can only be resumed on the same resources/hosts that it was previously running on (because this is where its state was saved). This means that the paused low-priority workload must wait for the higher priority job that interrupted it to end and release its resources (action 504) before resuming (state 505), whereas if the low-priority workload had been killed as in FIG. 4, it would immediately be free to restart on any resource that becomes available in the grid.

FIG. 6 illustrates a state transition diagram of a low-priority workload that is periodically check-pointed, then preempted, then resumed from a saved check point. Check-pointing may be considered the best of both worlds because it externally saves the preempted workload's state so that it can be resumed anywhere in the grid. As the workload is running (state 601), its state is being periodically or dynamically saved (action 612) to an external location 610. When the workload is killed (action 602), it is returned to the pending queue (state 603) to be rescheduled in the grid. Once it is rescheduled (action 604), the preempted workload can then be restarted on the new grid resources using its most recent state (action 614), which had been saved in the external storage 610.

Notice, however, that in each case illustrated in FIGS. 4-6, the workload goes from a state in which it is running (e.g., states 401, 501, 601), to one in which it is not (e.g., states 403, 503, 603) because it is interrupted by the preemption process. Often, this essentially amounts to killing the workload even if pausing was the intent: for instance, any licenses that the workload had been using might have been reclaimed in the interim, or its network connections may have timed out. For such reasons, the workload may not be able to resume or restart after it is preempted, regardless of which preemption action was taken.

SUMMARY

The development of live migration technology provides a new option for releasing grid resources. It enables running workloads to be moved from one location to another with (effectively) no down time. Live migration refers to the process of moving a running workload between different physical machines in a grid without disconnecting the client or workload. Memory, storage, and/or network connectivity of the workload are transferred from the original host machine(s) to the destination host machine(s). For instance, workloads running in a virtual machine can be live migrated to another host without being interrupted. Note that embodiments of the present invention are not limited to the foregoing mechanism to perform as migration operation. Any workload that can be migrated without interrupting its underlying process is also referred to herein as "live migratable."

Embodiments of the present invention provide a method to preempt a live migratable workload running on a grid computing system node, allowing it to release its resources for use by a higher priority workload by moving to another place in the grid without interruption.

Aspects of the present invention provide, in a distributed computing system, a method comprising receiving a request to schedule a higher priority workload to run on a first host coupled to the distributed computing system, wherein first resources in the first host needed to run the higher priority workload are dedicated for use by a lower priority workload currently running on the first host when the request is received, wherein the higher priority workload is assigned a higher priority designation than the lower priority workload within the distributed computing system; scheduling a dummy workload that is a copy of the lower priority workload, wherein the dummy workload is scheduled at a highest priority to run on a second host coupled to the distributed computing system; reserving second resources to run the dummy workload on the second host; initiating a live migration of the lower priority workload from the first host to the second host; and dispatching the higher priority workload to run on the first host using the first resources in the first host. The first host or the second host may comprise a multiple of separate machines coupled to the distributed computing system. The method may further release the first resources in the first host after the lower priority workload has been live migrated to the second host. The higher priority workload may then be dispatched to run on the first host using the first resources in the first host. The live migration of the lower priority workload results in the lower priority workload running on the second host using the second resources. The method may further determine whether the lower priority workload is preemptable and live migratable previous to scheduling the dummy workload. The dispatching of the higher priority workload to run on the first host using the first resources in the first host is performed subsequent to completion of the live migration of the lower priority workload from the first host to the second host. The first and second hosts may be located in separate physical machines in the distributed computing system.

Aspects of the present invention provide, in a grid computing system comprising a plurality of grid nodes coupled to the grid computing system, a method comprising receiving a request to schedule a higher priority job to run on one or more first grid nodes of the plurality of grid nodes, wherein first resources in the one or more first grid nodes needed to run the higher priority job are dedicated for use by a lower priority job running on the one or more first grid nodes, wherein the higher priority job is assigned a higher priority designation than the lower priority job within the grid computing system; scheduling a dummy job that is a copy of the lower priority job, wherein the dummy job is scheduled at a highest priority within the grid is computing system; reserving second resources to run the dummy job on one or more second grid nodes of the plurality of grid nodes; initiating a live migration of the lower priority job from the one or more first grid nodes to the one or more second grid nodes; and dispatching the higher priority job to run on the one or more first grid nodes using the first resources in the one or more first grid nodes upon successful completion of the live migration of the lower priority job from the one or more first grid nodes to the one or more second grid nodes. The method may further comprise releasing the first resources in the one or more first grid nodes subsequent to the successful completion of the live migration of the lower priority job from the one or more first grid nodes to the one or more second grid nodes. The method may further comprise reserving third resources to run the dummy job on the one or more first grid nodes, and releasing the third resources in the one or more first grid nodes subsequent to the successful completion of the live migration of the lower priority job from the one or more first grid nodes to the one or more second grid nodes. The third resources may be the same as the first resources. The higher priority job may be dispatched to run on the one or more first grid nodes using the first resources in the one or more first grid nodes. The method may further comprise live migrating the lower priority job to run on the one or more second grid nodes using the second resources. The method may further comprise determining whether the lower priority job is preemptable previous to scheduling the dummy job. The method may further comprise determining whether the lower priority job is live migratable previous to scheduling the dummy job. The plurality of grid nodes may be located in separate physical machines in the grid computing system.

Aspects of the present invention provide, in as grid computing system comprising a plurality of grid nodes coupled to the grid computing system, a method comprising receiving, from one of the plurality of grid nodes, a request to schedule as higher priority workload to run on one or more first grid nodes of the plurality of grid nodes, wherein first resources in the one or more first grid nodes needed to run the higher priority workload are dedicated for use by a lower priority workload currently running on the one or more first grid nodes when the request is received, wherein the higher priority workload is assigned as higher priority designation than the lower priority workload within the grid computing system; scheduling a dummy workload that is a copy of the lower priority workload, wherein the dummy workload is scheduled at a highest priority to run on one or more second grid nodes of the plurality of grid nodes reserving second resources required to run the dummy workload on the one or more second grid nodes; initiating a live migration of the lower priority workload from the one or more first grid nodes to the one or more second grid nodes; and dispatching the higher priority workload to run on the one or more first grid nodes using the first resources in the one or more first grid nodes; and live migrating the lower priority workload from the one or more first grid nodes to the one or more second grid nodes in response to the initiation by the grid scheduler of the live migration of the lower priority workload from the one or more first grid nodes to the one or more second grid nodes. The dispatch of the higher priority workload to run on the one or more first grid nodes may be performed upon a successful completion of the live migration of the lower priority workload from the one or more first grid nodes to the one or more second grid nodes. The method may further comprise determining whether the lower priority workload is preemptable and live migratable previous to scheduling the dummy workload. The method may further comprise reserving third resources to run the dummy workload on the one or more first grid nodes, and releasing the third resources in the one or more first grid nodes subsequent to the successful completion of the live migration of the lower priority workload from the one or more first grid nodes to the one or more second grid nodes. The method may further comprise releasing the first resources in the first grid node after the lower priority job has been live migrated to the second grid node.

DETAILED DESCRIPTION

Devices and systems and the relevant standards regarding grid computing systems, and other systems or standards that provide for the sharing of grid node resources on a network, whether now known or developed in the future, are assumed to be well known to persons skilled in the relevant arts. Such devices and systems may be implemented in any of the many alternate embodiments that are available without departing from the spirit of embodiments of the present invention. Detailed descriptions of such devices and systems, and the underlying resource-sharing mechanisms, are not required for an understanding of embodiments of the present invention.

Embodiments of the present invention are not limited to implementation within a grid computing system, but may be applicable to any distributed computing system, including, but not limited to, a cloud computing system.

Figure 1:
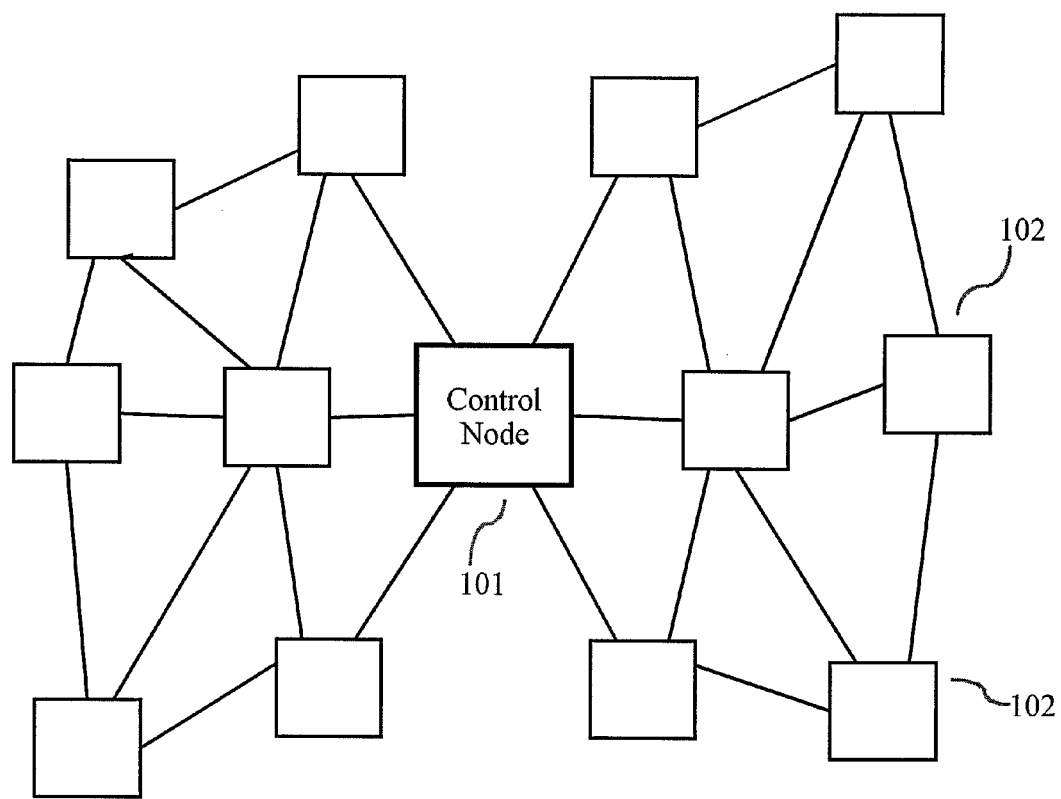
FIG. 1 illustrates a simplified block diagram of a grid computing system.

FIG. 1 illustrates a simplified block diagram of an exemplary grid computing system, or network, 100, which may be configured in accordance with embodiments of the present invention. A grid control node 101 is a machine, or machines, on the grid 100 that distributes workloads, or jobs, to the end nodes 102. The grid control node 101 may also execute workloads, or jobs, that are sent to the grid 100. A grid node 102 is a machine (e.g., computer workstation, server, resource, member, donor, client, host, etc.) coupled to the grid computing system 100 that is capable of receiving and executing workloads that are distributed to the grid computing system 100.

Figure 2:
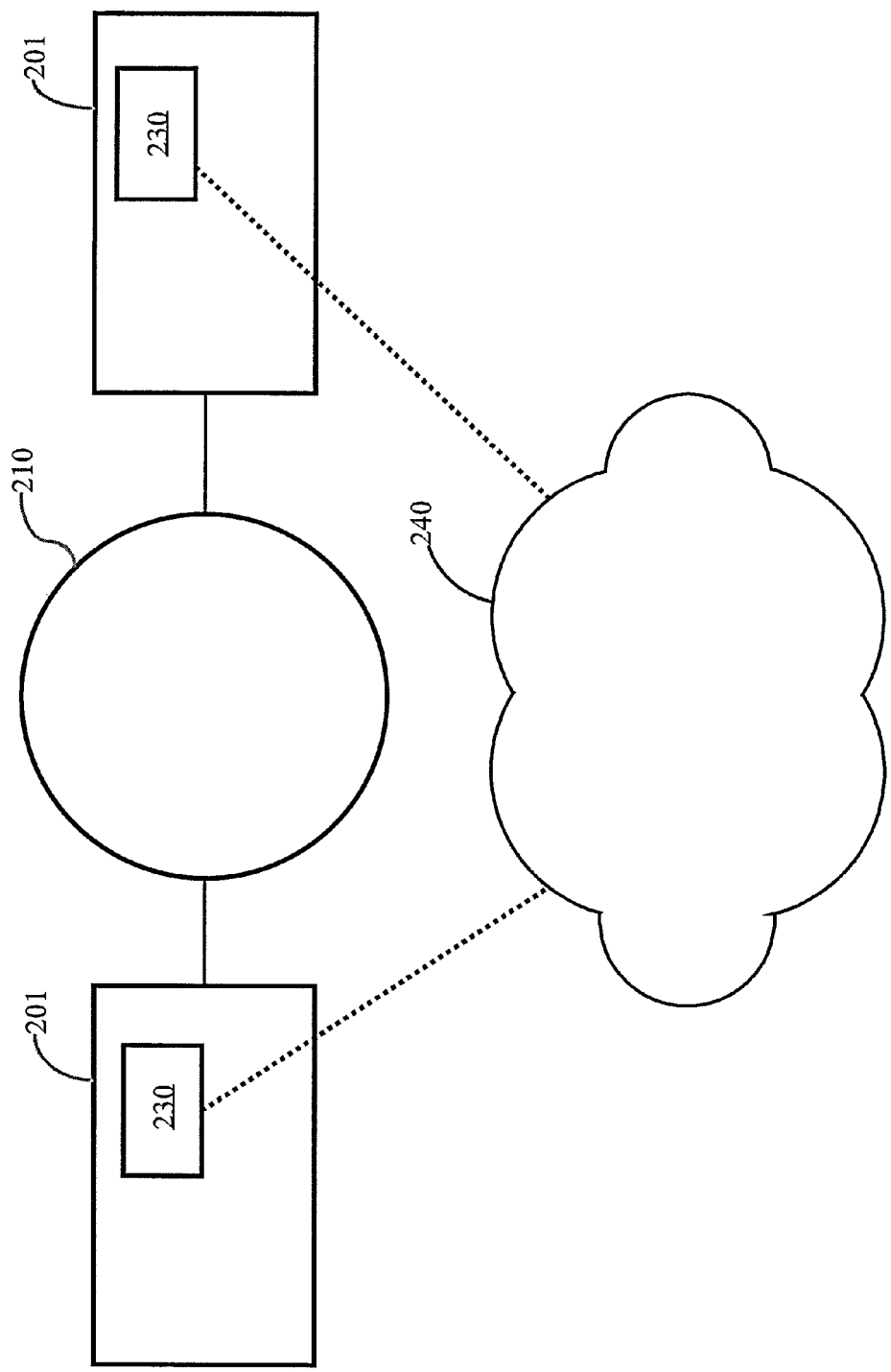
FIG. 2 illustrates how a grid computing system utilizes excess resources within the grid.

Another way to envision operation of a grid is described with reference to FIG. 2, which depicts a computer network 210 that includes two or more grid nodes 201, each of which may include the resources typical in a modern workstation, server, host, etc., (e.g., a CPU 230, disk drive(s), memory, etc.). The resources (e.g., CPU slots, computing cycles, physical and logical compute engines and/or architectures, physical and logical servers and devices, particular software programs, software licenses, policies, memory, device memory, storage devices, data communication capacity, etc.) on the grid nodes 201 may be grossly underutilized and may be, in fact, idle most of the time. As such, the excess resources may be combined into a kind of virtual computer 240, which may be used to perform useful work. This virtual computer 240 is known as a grid or a grid environment and is created using techniques and standards which are well known to those of ordinary skill in the art. The work done by the grid 240 is known as a grid workload and the components of that grid workload may be referred to as grid computations. This virtual computer or grid 240 has no independent physical presence but exists simply as the shared excess CPU cycles and other resources of grid nodes 201 as combined and managed to perform grid computations for a dispatched grid workload or job using any of the several embodiments of grid computing standards well known to those skilled in the art.

Figure 3:
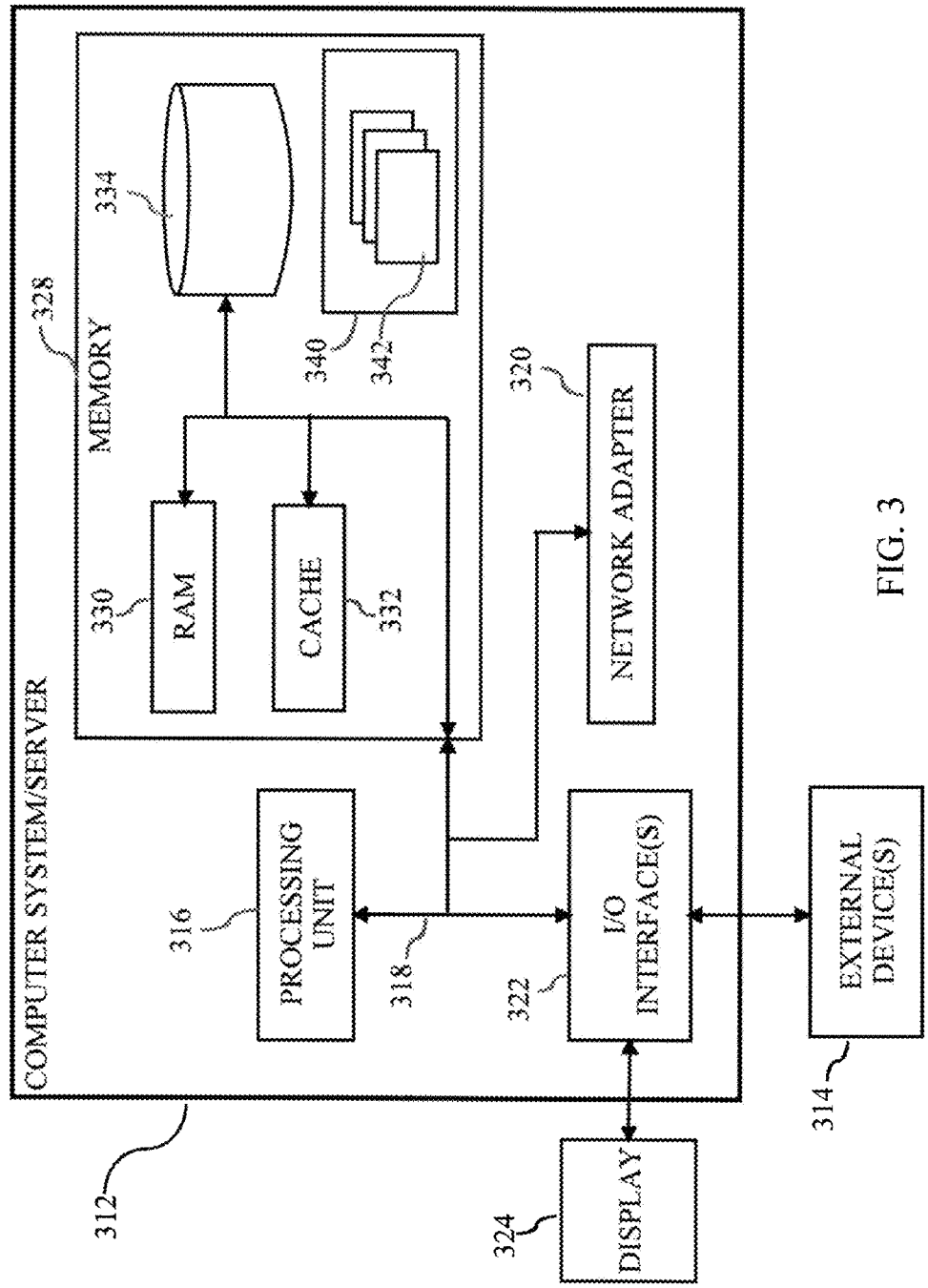
FIG. 3 illustrates an exemplary grid node within a grid computing system.

Referring to FIG. 3, an exemplary computer system/workstation/server/host 312 in a grid node 101, 102 is shown in the form of as general-purpose computing device. The components of a computer system/workstation/server/host 312 may include, but are not limited to, one or more processors or processing units (e.g., processor cores) 316, a system memory 328, and a bus 318 that couples various system components including system memory 328 to the processor(s) 316. Embodiments of the present invention are not limited to such a configuration. For example, as computer system/workstation/server/host may have multiple memory nodes connected by multiple buses to one or more CPUs, such as found within a typical Non-Uniform Memory Access/Architecture ("NUMA").

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ("ISA") bus, Micro Channel Architecture ("MCA") bus. Enhanced ISA ("EISA") bus, Video Electronics Standards Association ("VESA") local bus, and Peripheral Component Interconnects ("PCI") bus.

A computer system/workstation/server/host 312 may include a variety of computer system readable media. Such media may be any available media that is accessible by a computer system/workstation/server/host 312, and may include both volatile and non-volatile media, and/or removable and non-removable media.

The system memory 328 may include computer system readable media in the form of volatile memory, such as random access memory ("RAM") 330 anchor cache memory 332. The is computer system/workstation/server/host 312 may further include other removable/non-removable, volatile/non-volatile computer system storage media. By way of example only, the storage system 334 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media may be provided. In such instances, each may be connected to the bus 318 by one or more data media interfaces. As will be further described below, the memory 328 may include at least one program product having a set (e.g., at least one) of program modules that are configured to carry out the functions of embodiments of the present invention.

A workload optimization program/utility 340, having a set (at least one) of program modules 342, may be stored in the memory 328 by way of example, and not limitation, as well as an operating system, one or more application programs, other program modules, and program data. Each of the operating system, one or more application programs, other program modules, and program data or some combination thereof, may include an implementation of a networking environment. The program modules 342 generally carry out the functions and/or methodologies of embodiments of the present invention as described herein.

A computer system/workstation/server/host 312 may also communicate with one or more external devices 314 such as a keyboard, a pointing device, a display 324, etc.; one or more devices that enable a user to interact with a computer system/workstation/server/host 312; and/or any devices (e.g., network card, modem, etc.) that enable a computer system/workstation/server/host 312 to communicate with one or more other computing devices. Such communication can occur via I/O interfaces 322. Still yet, a computer system/workstation/server/host 312 can communicate with one or more networks such as a local area network ("LAN"), a general wide area network ("WAN"), and/or a public network (e.g., the Internet) via a network adapter 320, including to enable each of the nodes 101, 102 to communicate with the grid network 100. As depicted, the network adapter 320 communicates with the other components of a computer system/workstation/server/host 312 via the bus 318. It should be understood that although not shown, other hardware and/or software components may be used in conjunction with a computer system/workstation/server/host 312. Examples include, but are not limited to, microcode, device drivers, redundant processing units, external disk drive arrays, RAID systems, tape drives, and data archival storage systems, etc.

Grid schedulers operate as middleware to allow workloads dispatched to the grid to be prioritized in order to ensure that the most important jobs (e.g., a higher priority workload or job relative to a lower priority workload or job) have preferred access to resources such as CPU slots, licenses, and memory. Higher priority workloads waiting for resources may also be configured to preempt lower priority jobs, forcing them to release the resources they occupy so that the more important computation can use them. As previously described, the preempted resources have been typically released by either killing or suspending the workload that is using them. If killed, the workload will either be rescheduled to start from the beginning, or will have been externally check-pointed so it can start on a different host from the last saved point. If suspended, it will have to wait until resources are again available on the host where it was running.

It may be more desirable to suspend rather than re-queue a job so as not to lose performed work. However, if the higher priority workload is very long running, it could starve out the lower priority job. Chock-pointing is theoretically the best of both worlds, since work is not lost because the lower priority job is not confined to its original host. In every case, the workload's running process is interrupted when it is preempted. This can essentially amount to killing and re-queuing the workload even if pausing or saving was the intent. For instance, any software licenses that the workload had been using might have been reclaimed in the interim, or its network connections may have timed out. For those reasons, the workload may not be able to resume or restart after it is preempted regardless of the preemption action taken.

Live migration technology can be used to move jobs from one host to another while the workload continues to run. In order to use this operation for facilitating the preemptions of workloads, a grid scheduler in accordance with embodiments of the present invention implements two things in order for such a move to take place: (1) determine whether there are available resources elsewhere on the grid to which a preempted job could be moved, and (2) retain the total required resources for the higher priority job as well as the resources at the lower priority job's destination.

There are two implicit assumptions made by existing grid scheduling middleware that are abandoned in order to suitably implement live migration in embodiments of the present invention: (1) current grid schedulers assume that the preemption action always succeeds; however, live migration can fail for various reasons and cannot be assumed to succeed, and (2) current grid schedulers assume that the preemption action occurs instantaneously; however, live migration can take on the order of several minutes even when successful.

These assumptions actually correspond directly to the two problems previously described. First, live migration might not be possible because there are no available resources in the grid; therefore, a process is implemented to determine this and to handle a failure. Second, if space is found to move as job, resources need to be allocated at both its source host and its destination host while the operation takes place in order to ensure that no other workload is scheduled at the source site (which is to be used by the pending higher priority job) or the target site (which is to be used by the existing lower priority job being moved, or migrated).

Embodiments of the present invention presuppose that the workload in the grid can be live migrated, for example, by using virtual machines as the workload's container. Given this property, the grid scheduler middleware is modified to handle a preempted workload in a different manner. Traditional forms of preemption cause the net available resources in the grid to increase because the preempted job relinquishes resources. This is not the case with live migration; therefore, traditional preemptive scheduling is not sufficient. The grid scheduler middleware is modified to enable it to decide if there is an available location to migrate the lower priority workload to, and the most suitable such place based on its original requirements.

Figure 10:
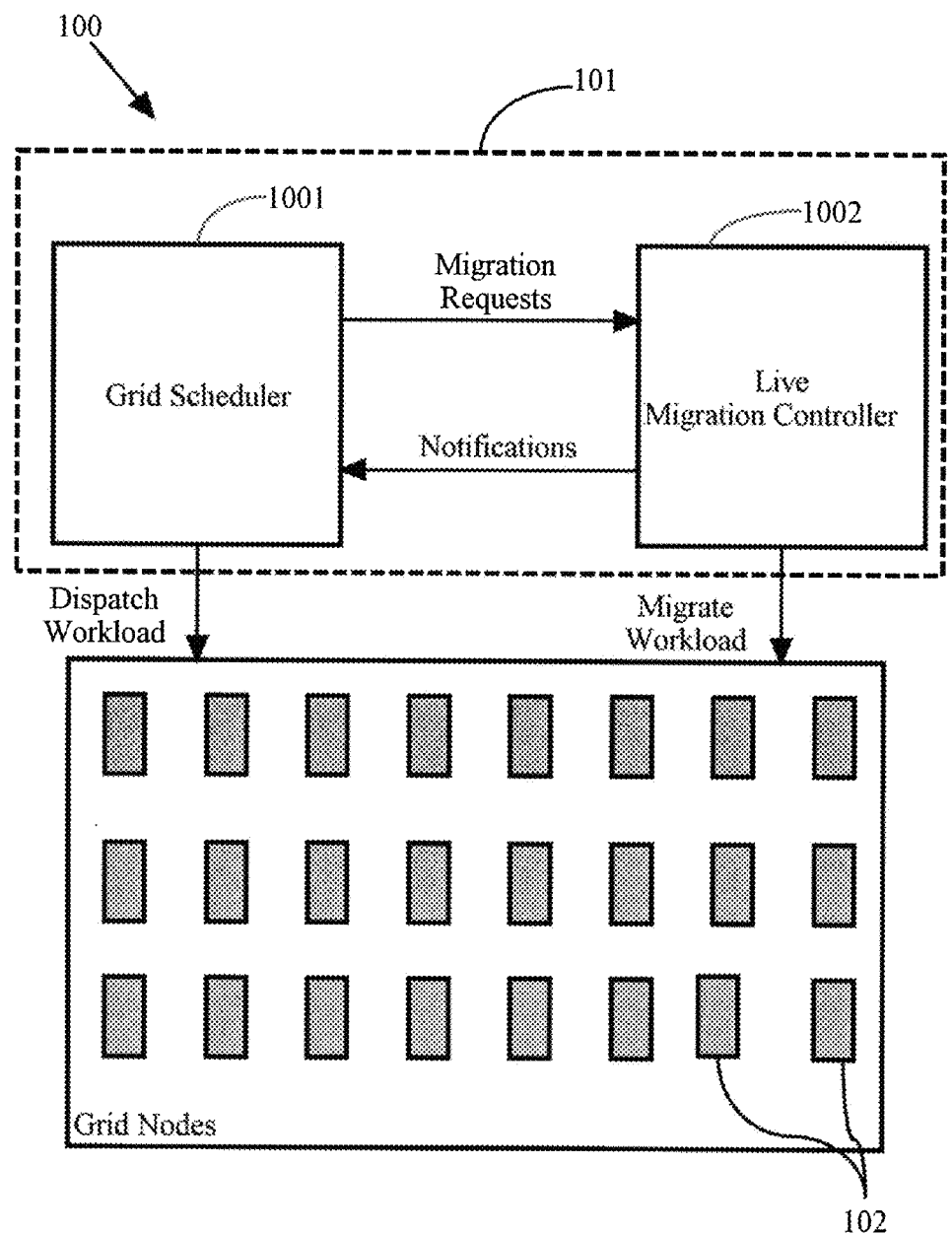
FIG. 10 illustrates a grid computing system configured in accordance with embodiments of the present invention.
Figure 11:
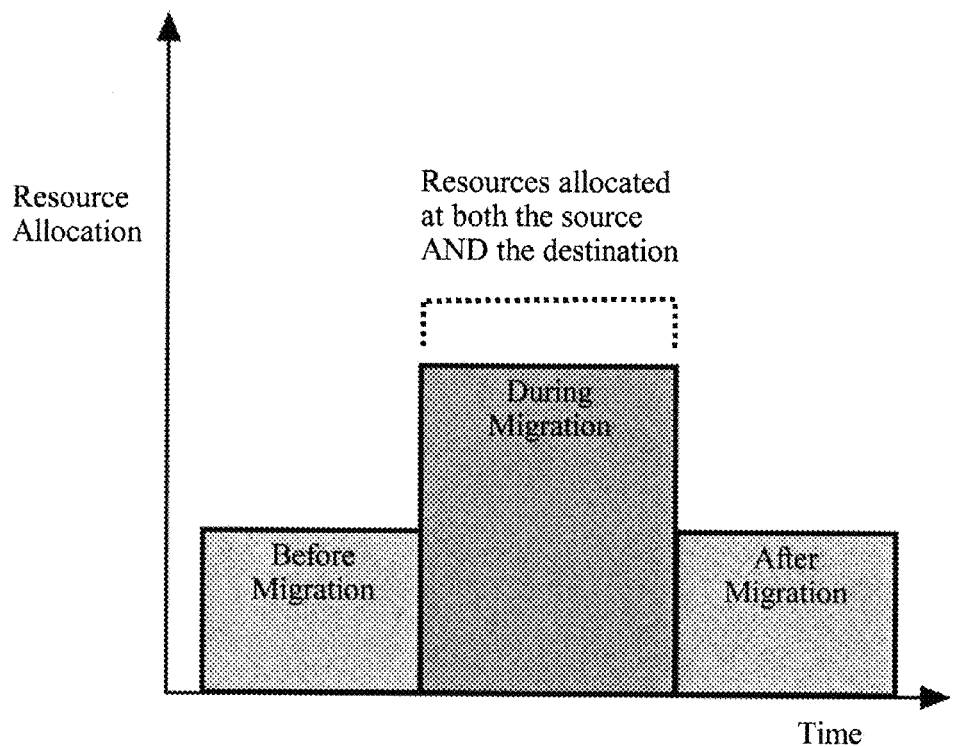
FIG. 11 illustrates allocations of resources within a grid computing system in accordance with embodiments of the present invention.

FIG. 10 illustrates embodiments of the present invention in which a grid scheduler 1001 is implemented to operate in conjunction with a live migration controller 1002. Once the grid scheduler 1001 has requested that the lower priority workload be migrated, it waits for the process to complete before it can dispatch the higher priority workload to the vacated resources. During this process, the grid scheduler 1001 ensures that no new jobs are dispatched to either the source or destination of the migration (since the lower priority workload's actual location during this period is essentially ambiguous). Embodiments of the present invention ensure this by allocating resources for the migrating job at both the source and destination of the migration during the process: therefore, the job will essentially be charged for double its original requirements during this time. This is illustrated in the chart in FIG. 11.

The grid computing system illustrated with respect to FIG. 10 may be implemented within a grid computing system such as system 100, whereby the grid scheduler 1001 and the live migration controller 1002 may be part of the grid control node 101 (or alternatively, operating on separate hosts). The grid scheduler 1001 and/or the live migration controller 1002 may each be software programs that run as a single instance (process or service) on a dedicated computer on the grid or on one of the grid nodes, sharing CPU cycles with the interactive workload of the grid node. Alternatively, the grid scheduler 1001 and/or the live migration controller 1002 may be implemented as a distributed program across the grid. Each of the grid nodes 102 may be utilized as the hosts described hereinafter.

Figure 7:
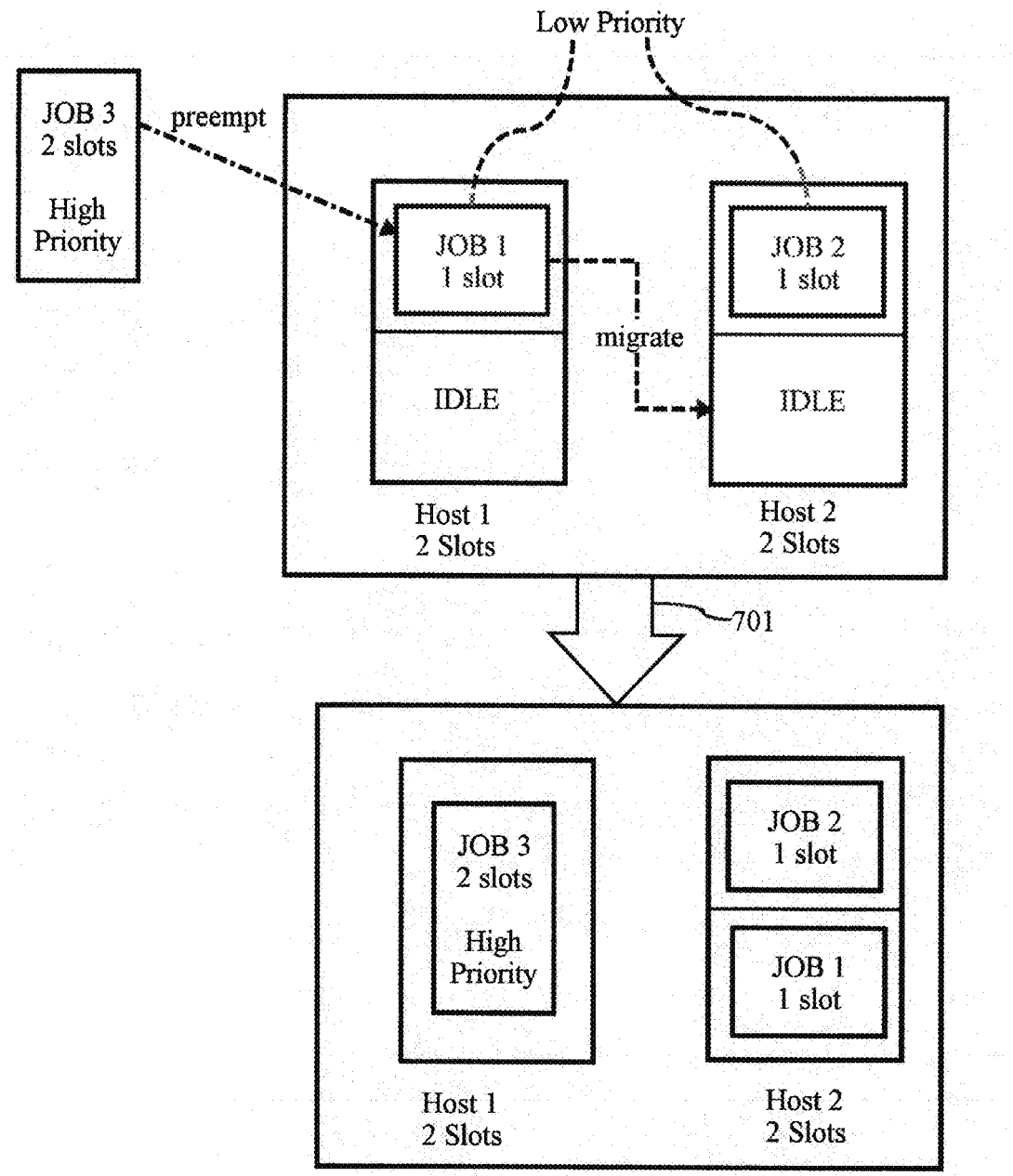
FIG. 7 illustrates an example of preemption of a low-priority job in accordance with embodiments of the present invention.

Embodiments of the present invention are further illustrated with respect to the example illustrated in FIG. 7. A live migratable lower priority workload (e.g., Job 1), once preempted, will be placed on a suitable and available host (e.g., Host 2) found by the grid scheduler 1001. Once the lower priority workload is live migrated, the higher priority workload (e.g., Job 3) can take its resources (e.g., in Host 1). In contrast to previous approaches, which interrupt the running application to release its resources, the lower priority workload can keep running without being interrupted, and any issues which would be caused by the interruption, such as license reclaiming or TCP connection breaks, will no longer occur. Embodiments of the present invention therefore implement as method that enables grid management software to support live migration as an eligible action when preemption is triggered, whereby the most suitable host that satisfies the original requirements of the lower priority workload can be found.

Note that embodiments of the present invention apply to situations where either or both of the lower priority workload and higher priority workload are operating on multiple hosts (which may be referred to as "cross-host parallel jobs"). In embodiments described herein and in the claims, references to a host also apply to multiple hosts.

Figure 8:
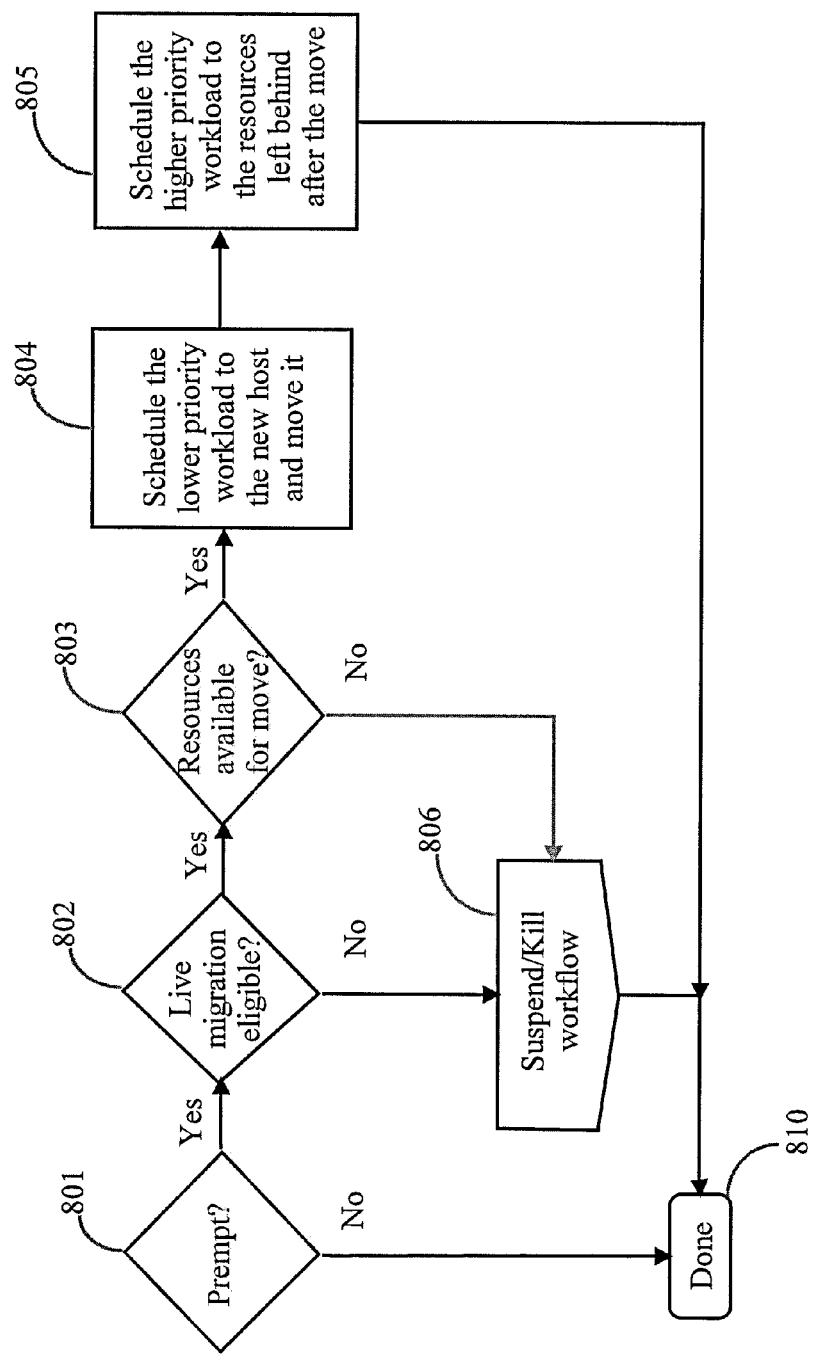
FIG. 8 illustrates a flow diagram of a control flow inside a grid scheduler when executing preemption logic with live migration.

FIG. 8 illustrates a flow diagram showing a flow of control inside the grid scheduler 1001 when executing preemption logic with live migration in accordance with embodiments of the present invention. If the grid scheduler 1001 determines that a lower priority workload can be preempted (step 801), then the process moves to step 802. A preemptable workload uses resources that can be reassigned. The grid scheduler may implement a workload analyzer, which analyzes each computer program representing a grid workload or job and categorizes it as preemptable or non-preemptable. In step 802, it is determined whether the job to be preempted is eligible for live migration. This may be performed via communications between the grid scheduler 1001 and the live migration controller 1002. If so, then step 803 determines if there are resources available to which it can be moved (if not, the process can optionally fall back on traditional preemption functionality, or potentially keep pending the high priority job, as depicted by action step 806). If resources are found for the move, in step 804, the lower priority workload is scheduled to the new host (or a multiple of hosts), and in step 805, the higher priority workload is scheduled to the space left behind, i.e., the resources now released by the lower priority workload that the higher priority workload requires (plus the higher priority workload is scheduled to any other resources it requires that are already available). In the case of cross-host parallel jobs, the steps described with respect to FIG. 8 apply to all of the sub-processes of the lower and/or higher priority workloads running on the multiple hosts.

Figure 9:
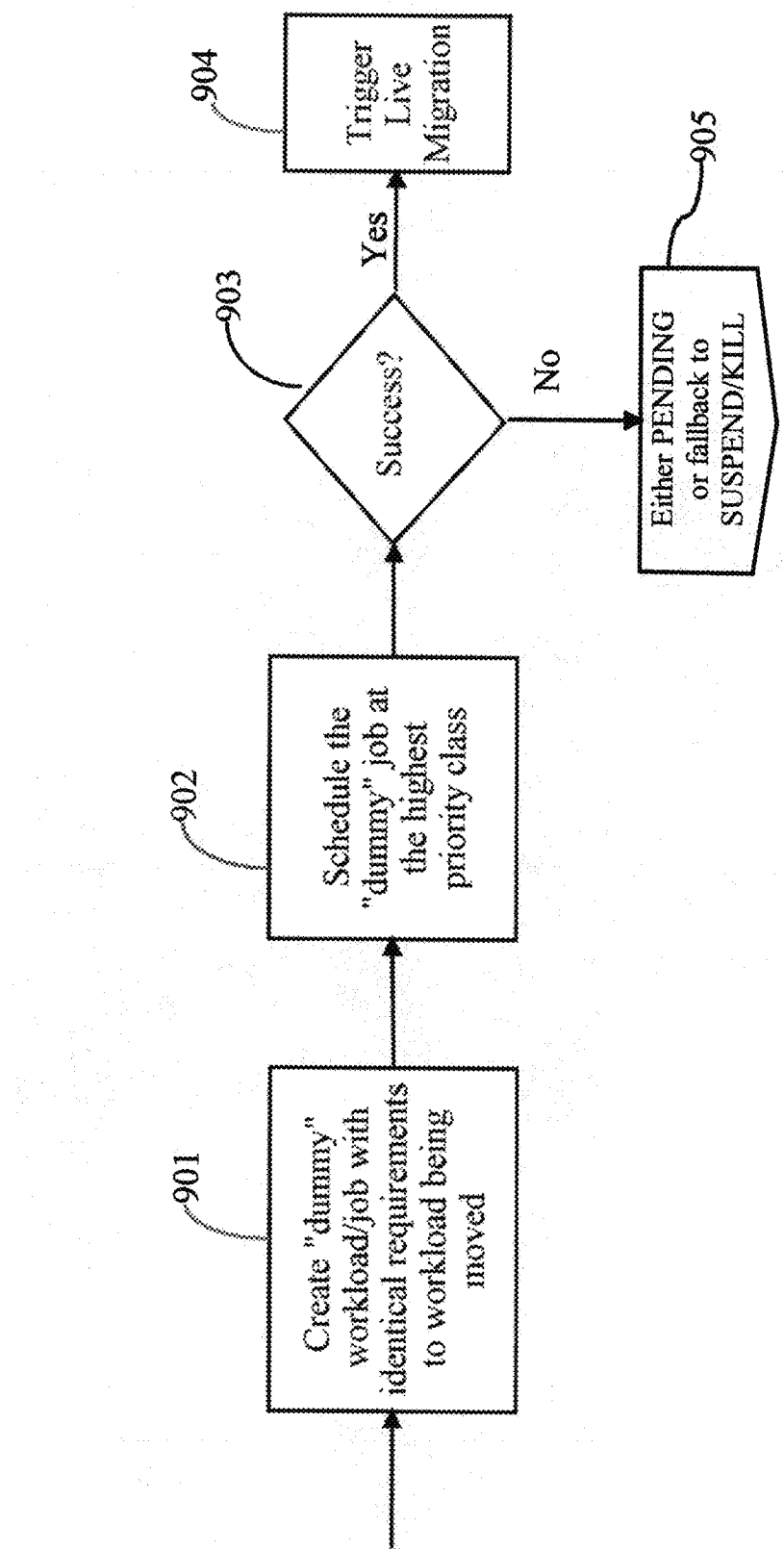
FIG. 9 illustrates a flow chart for scheduling a dummy workload in accordance with embodiments of the present invention.

FIG. 9 illustrates a flow diagram corresponding to a mechanism/system that the grid scheduler 1001 uses to find available resources for the migration. To do this, a "dummy job" mechanism is utilized. i.e., in step 901, as fake workload that has identical resource requirements as the low-priority workload is submitted to the grid scheduler 1001. The system then schedules this "dummy" workload normally in step 902 and its result is the desired location. Note that the "dummy" workload is scheduled at the highest priority class because it is essentially attempting to make resources for a pending higher priority job, which the scheduler has already determined should be running.

Execution of the live migration action involves the grid management system interacting with the live migration controller 1002, which performs the actions to move a workload from one host (or a multiple of hosts) to another host (or a multiple of hosts). When the grid scheduler 1001 has made the decision 903 to live migrate the lower priority workload, it initiates this process by notifying the live migration controller 1002 to take the corresponding action 904. For instance, if the workload is running on a virtual machine, the live migration controller 1002 would move the target virtual machine (i.e., the controller may be calling the hypervisor's virtualization tools to perform the action). Each grid node may be equipped with a hypervisor, which is software running on the grid node that implements a computing concept known as "virtual machines." Virtual machines provide a partitioning of the execution environment between the interactive workload of a grid node and its potential grid workload such that the grid workload is contained and protected in the virtual machine. Virtual machines have been well known to those of ordinary skill in the art for many years, and a detailed treatment of virtual machines is not necessary for the understanding of embodiments of the present invention. Virtual machines provide one possible mechanism by which a grid node of embodiments of the present invention might maintain some logical separation between the node's interactive workload (i.e., locally requested jobs) and the grid workload assigned to the grid node.

Figure 4:
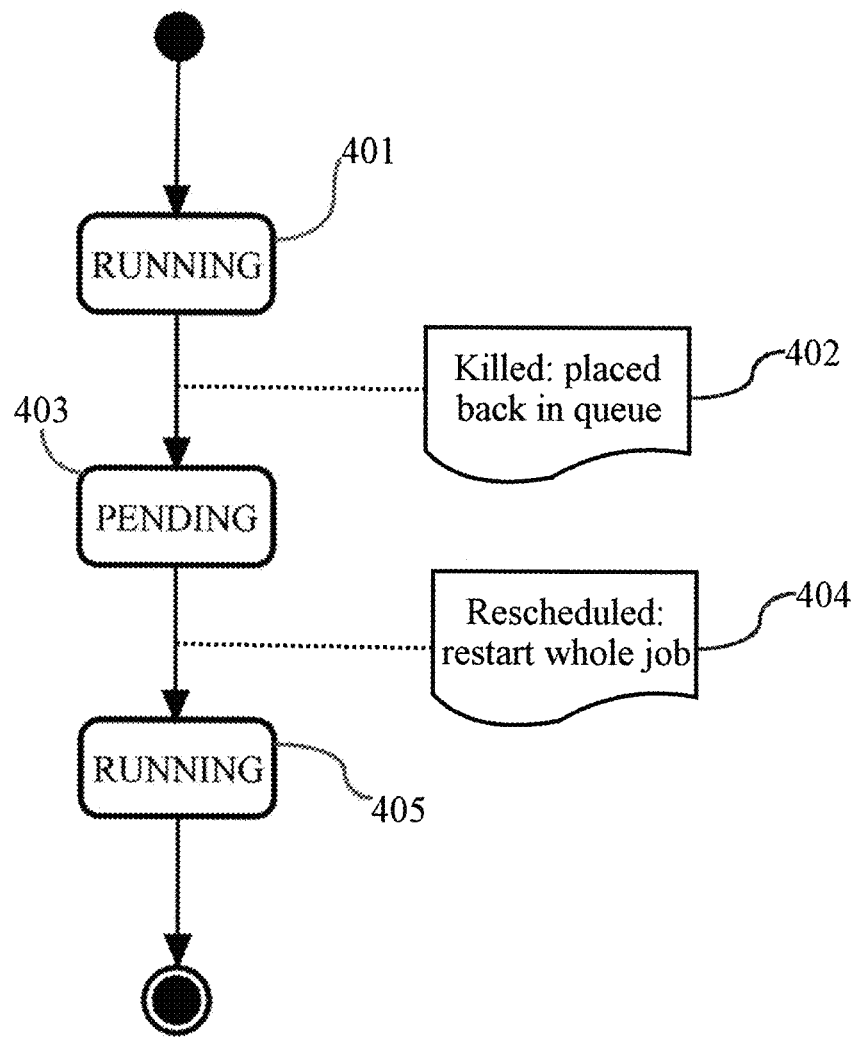
FIG. 4 illustrates a state transition diagram of a job preempted by killing it.
Figure 5:
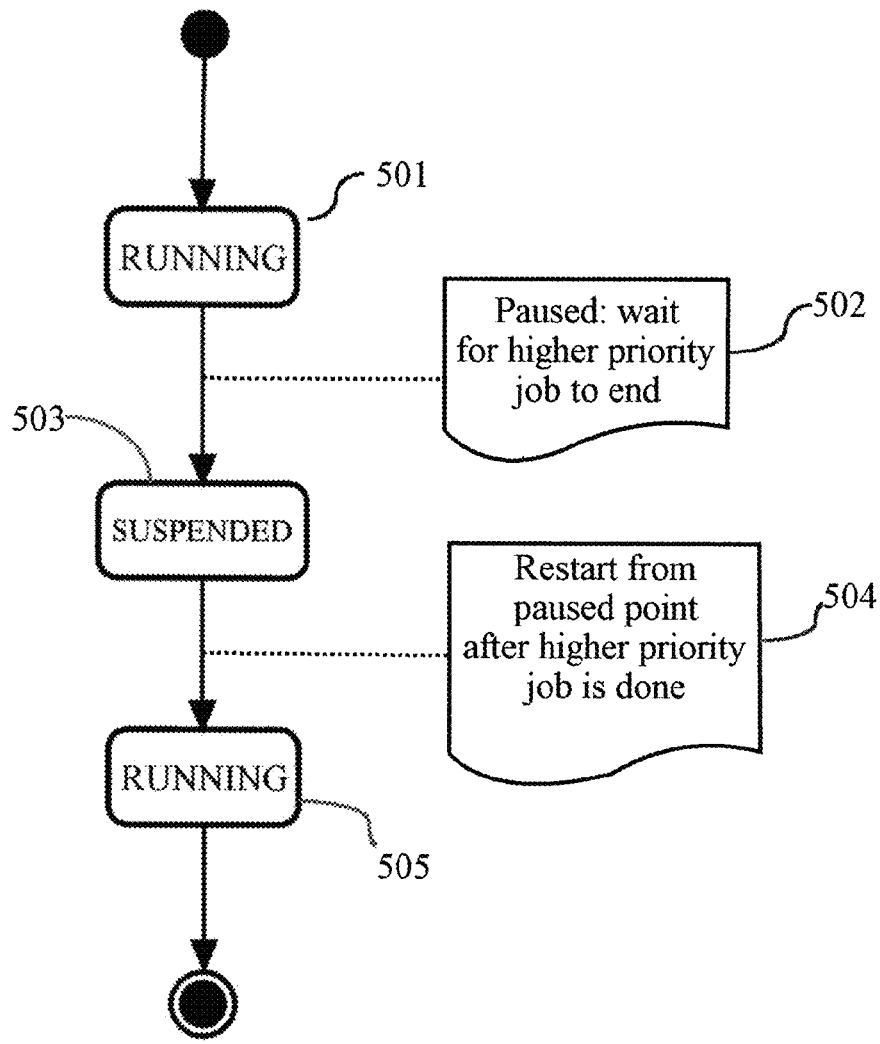
FIG. 5 illustrates a state transition diagram of a job preempted by suspending it.
Figure 6:
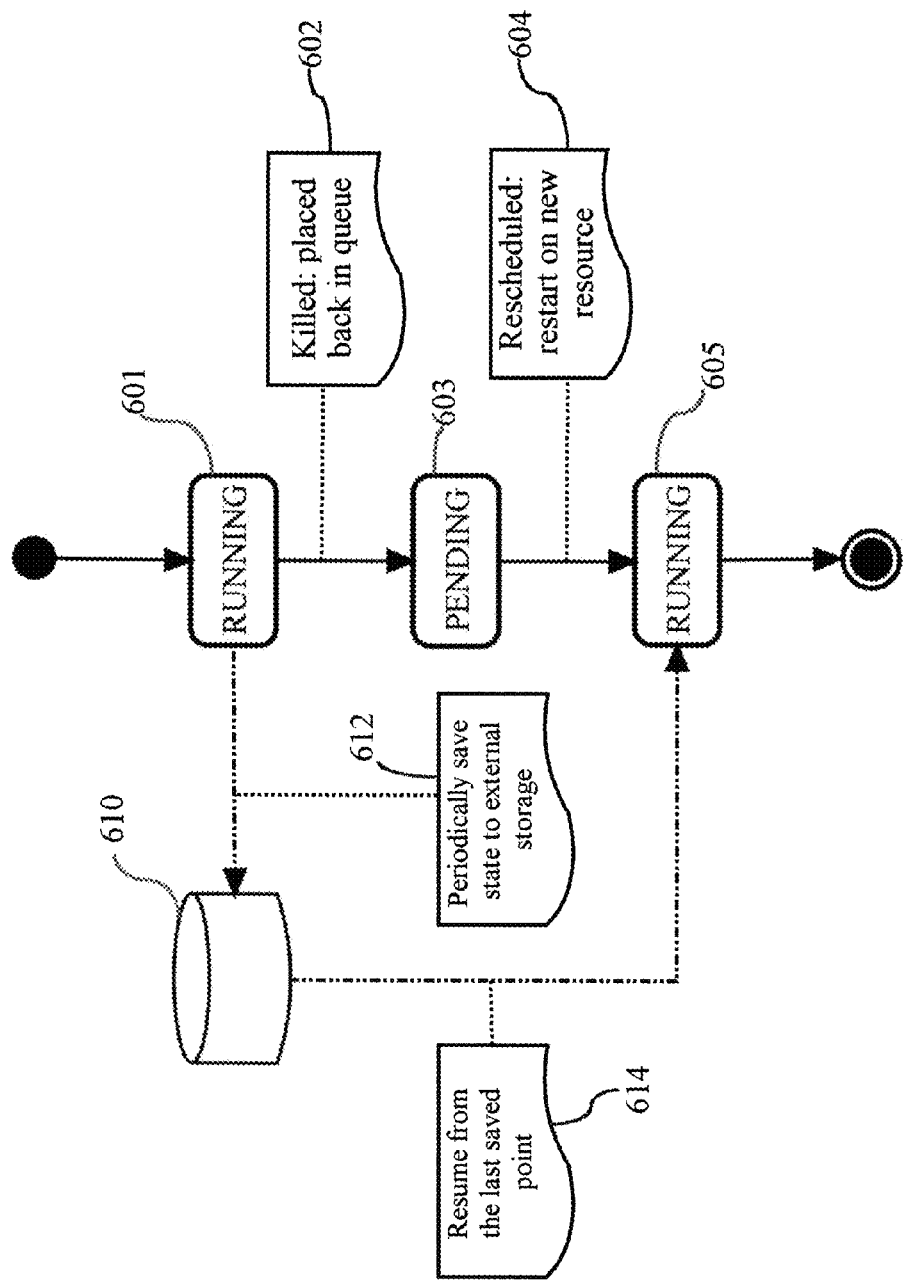
FIG. 6 illustrates a state transition diagram of as process for check-pointing and preempting a job.

The live migration controller 1002 monitors the progress of the migration of the priority workload to the new host (or a multiple of hosts), and notifies the grid scheduler 1001 once it is complete. If the grid scheduler 1001 determines that a live migration of the lower priority workload is not available, then it can resort to one of the typical preemption actions 905 previously described with respect to FIGS. 4-6.

The following describes an example of the foregoing with respect to FIG. 7. When a decision is made by a grid scheduler 1001 to preempt a lower priority workload (e.g., Job 1) to make way for a higher priority workload (e.g., Job 3), a usual preemption mechanism is used to reserve Job 1's resources for Job 3. The grid scheduler 1001 then creates an internal copy of job 1 (i.e., the dummy job) and queues it for normal scheduling (step 901 in FIG. 9). The dummy job is identical to Job 1 except that: (1) it is scheduled at the highest possible priority (before any other workload) (step 902 in FIG. 9) because it is intended to make space for a preempt job that has already been scheduled, and (2) it is prevented from itself preempting other jobs in order to avoid an infinite regress. If the dummy job is successfully scheduled (step 903 in FIG. 9), the grid scheduler 1001 will resize the existing allocation of Job 1 by adding the allocation of the dummy job to it. This holds the source and target resources (e.g., the currently used slot in Host 1 and the idle slot in Host 2) while the migration takes place. The grid scheduler 1001 holds the allocation of the slot Job 1 is currently running on (the source), so that the grid scheduler 1001 does not detect these resources as released and allow the higher priority Job 3 to run prematurely. Furthermore, the grid scheduler 1001 holds the allocation of the idle slot in Host 2 (at the highest possible priority) so that no other jobs are scheduled to that slot in the interim while the move of Job 1 takes place.

The grid scheduler 1001 then triggers (i.e., initiates) the migration (step 904 in FIG. 9) by requesting it of the live migration controller 1002. If the migration is unsuccessful, or the dummy job cannot be successfully scheduled, then the grid scheduler 1001 can optionally fall back to using previously existing preemption actions (step 905 in FIG. 9) to free up resources for Job 3. Once the migration is complete (indicated in FIG. 7 by arrow 701), Job 1's allocation is again resized (hut this time decreased) to encompass only the allocation of the dummy job, releasing its initial allocation. At this point the higher priority job (i.e., Job 3) is dispatched (e.g., to Host 1 (or a multiple of hosts)).

As will be appreciated by one skilled in the art, aspects of the present invention may be embodied as a system, method, and/or program product. Accordingly, aspects of the present invention may take the form of an entirely hardware embodiment, an entirely software embodiment (including firmware, resident software, micro-code, etc.), or embodiments combining software and hardware aspects that may all generally be referred to herein as a "circuit," "circuitry," "module," or "system." Furthermore, aspects of the present invention may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using an appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowcharts and block diagrams in the figures illustrate architecture, functionality, and operation of possible implementations of systems, methods, and program products according to various embodiments of the present invention. In this regard, each block in the flowcharts and/or block diagrams ma represent a module, segment, or portion of code, which comprises one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors may for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to a processor and/or controller of a general purpose computer, special purpose computer, or other programmable data processing apparatus (e.g., controller) to produce a machine, such that the instructions, which execute via the processor of the computer or other programmable data processing apparatus, create means and/or circuitry for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices or the like.

Computer program code, i.e., instructions, for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a single machine, partly on a single machine as a stand-alone software package, partly on as single machine and partly on a remote machine, or entirely on the remote machine. In these scenarios, the machines may be connected to each other through any type of network, including, but not limited to, a local area network ("LAN"), and/or a wide area network ("WAN"), and/or the Internet.

These program instructions may also be stored in a computer readable storage medium that can direct a computer, other programmable data processing apparatus, controller, or other devices to function in a particular manner, such that the instructions stored in the computer readable medium produce an article of manufacture including instructions which implement the function/act specified in the flowchart(s) and/or block diagram block or blocks.

The program instructions may also be loaded onto a computer, other programmable data processing apparatus, controller, or other devices or machines to cause a series of operational steps to be performed on the computer, other programmable apparatus, or other devices or machines to produce a computer implemented process such that the instructions which execute on the computer, other programmable apparatus, or other devices or machines provide processes for implementing the functions/acts specified in the flowchart(s) and/or block diagram block or is blocks.

One or more databases may be included in a machine for storing and providing access to data for the various implementations. One skilled in the art will also appreciate that, for security reasons, any databases, systems, or components of embodiments of the present invention may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Reference is made herein to computer readable program code configured to perform certain functions. It should be understood that this may include selecting predefined logic blocks and logically associating them, such that they provide particular logic functions. It may also include programming computer software-based logic, wiring discrete hardware components, or a combination of any or all of the foregoing.

Reference throughout this specification to "one embodiment," "embodiments," or similar language means that a particular feature, structure, or characteristic described in connection with the embodiments is included in at least one embodiment of the present invention. Thus, appearances of the phrases "in one embodiment," "in an embodiment," "embodiments," and similar language throughout this specification may, but do not necessarily, all refer to the same embodiment. Furthermore, the described features, structures, aspects, and/or characteristics of the invention may be combined in any suitable manner in one or more embodiments. Correspondingly, even if features may be initially claimed as acting in certain combinations, one or more features from as claimed combination can in some cases be excised from the combination, and the claimed combination can be directed to a sub-combination or variation of a sub-combination.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiment's of the invention. One skilled in the relevant art will recognize, however, that the invention may be practiced without one or more of the specific details, or with other methods, components, materials, and so forth. In other instances, well-known structures, materials, or operations may be not shown or described in detail to avoid obscuring aspects of the invention.

Those skilled in the art having read this disclosure will recognize that changes and modifications may be made to the embodiments without departing from the scope of the present invention. It should be appreciated that the particular implementations shown and described herein may be illustrative of the invention and its best mode and may be not intended to otherwise limit the scope of the present invention in any way. Other variations may be within the scope of the following claims.

While this specification contains many specifics, these should not be construed as limitations on the scope of the invention or of what can be claimed, but rather as descriptions of features specific to particular implementations of the invention. Headings herein may be not intended to limit the invention, embodiments of the invention, or other matter disclosed under the headings.

As used herein, the terms "comprises," "comprising," or any other variation thereof, may be intended to cover a non-exclusive inclusion, such that a process, method, article, or apparatus that comprises a list of elements does not include only those elements but may include other is elements not expressly listed or inherent to such process, method, article, or apparatus. Further, no element described herein is required for the practice of the invention unless expressly described as essential or critical.

Herein, the term "or" may be intended to be inclusive, wherein "A or B" includes A or B and also includes both A and B.

The terminology used herein is for the purpose of describing particular embodiments only and is not intended to be limiting of the invention. As used herein, the singular forms "it," "an," and "the" may be intended to include the plural forms as well, unless the context clearly indicates otherwise. It will be further understood that the terms "comprises" and/or "comprising," when used in this specification, which may include the claims herein below, specify the presence of stated features, integers, steps, operations, elements, and/or components, but do not preclude the presence or addition of one or more other features, integers, steps, operations, elements, components, and/or groups thereof.

What is claimed:

1. In a distributed computing system, a method comprising:
    receiving a request to schedule a higher priority workload to run on a first host coupled to the distributed computing system, wherein first resources in the first host needed to run the higher priority workload are dedicated for use by a lower priority workload currently running on the first host when the request is received, wherein the higher priority workload is assigned a higher priority designation than the lower priority workload within the distributed computing system;
    scheduling a dummy workload that is a copy of the lower priority workload, wherein the dummy workload is scheduled at a highest priority to run on a second host coupled to the distributed computing system;

reserving second resources to run the dummy workload on the second host;

initiating a live migration of the lower priority workload from the first host to the second host; and dispatching the higher priority workload to run on the first host using the first resources in the first host.

2. The method as recited in claim 1, wherein the first host or the second host comprise a multiple of separate machines coupled to the distributed computing system.

3. The method as recited in claim 1, further comprising releasing the first resources in the first host after the lower priority workload has been live migrated to the second host.

4. The method as recited in claim 2, wherein the higher priority workload is dispatched to run on the first host using the first resources in the first host.

5. The method as recited in claim 1, wherein the live migration of the lower priority workload results in the lower priority workload running on the second host using the second resources.

6. The method as recited in claim 1, further comprising determining whether the lower priority workload is preemptable and live migratable previous to scheduling the dummy workload.

7. The method as recited in claim 1, wherein the dispatching of the higher priority workload to run on the first host using the first resources in the first host is performed subsequent to completion of the live migration of the lower priority workload from the first host to the second host.

8. The method as recited in claim 1, wherein the first and second hosts are located in separate physical machines in the distributed computing system.

9. In a grid computing system comprising a plurality of grid nodes coupled to the grid computing system, a method comprising:

receiving a request to schedule a higher priority job to run on one or more first grid nodes of the plurality of grid nodes, wherein first resources in the one or more first grid nodes needed to run the higher priority job are dedicated for use by a lower priority job running on the one or more first grid nodes, wherein the higher priority job is assigned a higher priority designation than the lower priority job within the grid computing system;

scheduling a dummy job that is a copy of the lower priority job, wherein the dummy job is scheduled at a highest priority within the grid computing system;

reserving second resources to run the dummy job on one or more second grid nodes of the plurality of grid nodes;

initiating a live migration of the lower priority job from the one or more first grid nodes to the one or more second grid nodes; and dispatching the higher priority job to run on the one or more first grid nodes using the first resources in the one or more first grid nodes upon successful completion of the live migration of the lower priority job from the one or more first grid nodes to the one or more second grid nodes.

10. The method as recited in claim 9, further comprising releasing the first resources in the one or more first grid nodes subsequent to the successful completion of the live migration of the lower priority job from the one or more first grid nodes to the one or more second grid nodes.

11. The method as recited in claim 10, further comprising:

reserving third resources to run the dummy job on the one or more first grid nodes; and releasing the third resources in the one or more first grid nodes subsequent to the successful completion of the live migration of the lower priority job from the one or more first grid nodes to the one or more second grid nodes.

12. The method as recited in claim 9, wherein the higher priority job is dispatched to run on the one or more first grid nodes using the first resources in the one or more first grid nodes.

13. The method as recited in claim 9, further comprising live migrating the lower priority job to run on the one or more second grid nodes using the second resources.

14. The method as recited in claim 9, further comprising determining whether the lower priority job is preemptable previous to scheduling the dummy job.

15. The method as recited in claim 9, further comprising determining whether the lower priority job is live migratable previous to scheduling the dummy job.

16. In a grid computing system comprising a plurality of grid nodes coupled to the grid computing system, a method comprising:

receiving, from one of the plurality of grid nodes, a request to schedule a higher priority workload to run on one or more first grid nodes of the plurality of grid nodes, wherein first resources in the one or more first grid nodes needed to run the higher priority workload are dedicated for use by a lower priority workload currently running on the one or more first grid nodes when the request is received, wherein the higher priority workload is assigned a higher priority designation than the lower priority workload within the grid computing system;

scheduling a dummy workload that is a copy of the lower priority workload, wherein the dummy workload is scheduled at a highest priority to run on one or more second grid nodes of the plurality of grid nodes;

reserving second resources required to run the dummy workload on the one or more second grid nodes;

initiating a live migration of the lower priority workload from the one or more first grid nodes to the one or more second grid nodes; and dispatching the higher priority workload to run on the one or more first grid nodes using the first resources in the one or more first grid nodes; and live migrating the lower priority workload from the one or more first grid nodes to the one or more second grid nodes in response to the initiation by the grid scheduler of the live migration of the lower priority workload from the one or more first grid nodes to the one or more second grid nodes.

17. The method as recited in claim 16, wherein the dispatch of the higher priority workload to run on the one or more first grid nodes is performed upon a successful completion of the live migration of the lower priority workload from the one or more first grid nodes to the one or more second grid nodes.

18. The method as recited in claim 16, further comprising determining whether the lower priority workload is preemptable and live migratable previous to scheduling the dummy workload.

19. The method as recited in claim 16, further comprising releasing the first resources in the first grid node after the lower priority job has been live migrated to the second grid node.

* * * * *